May 1, 1962 P. S. LJUNG ETAL 3,031,733
ARRANGEMENT FOR THE PRODUCTION OF MATS FROM FIBRE THREADS
Filed March 28, 1960
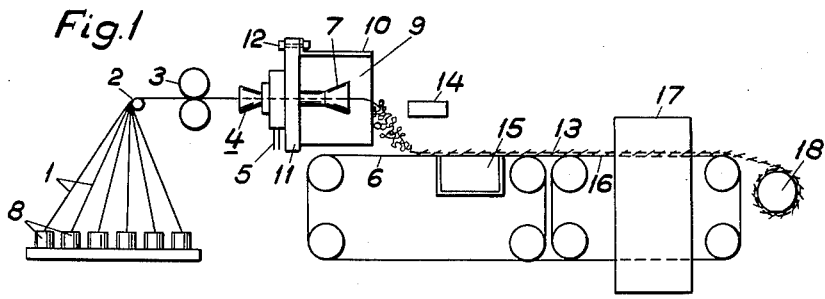
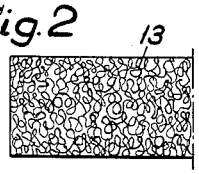
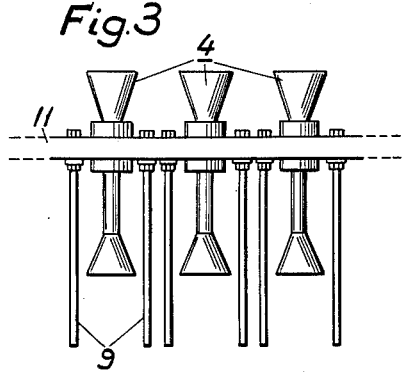
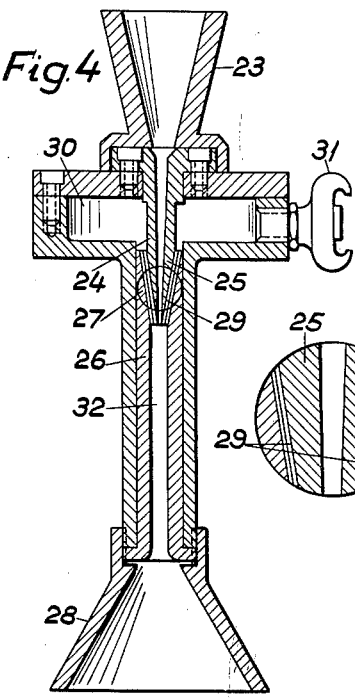
Pers Ljung
Cedrik Lindström INVENTOR.
BY Bailey, Stephens, & Huettig
ATTORNEYS 3,031,733
ARRANGEMENT FOR THE PRODUCTION OF
MATS FROM FIBRE THREADS
Per S. Ljung and Cedrik Lindström, Robertsfors, Sweden,
assignors to Allmanna Svenska Elektriska Aktiebolaget,
Vasteras, Sweden, a corporation of Sweden
Filed Mar. 28, 1960, Ser. No. 17,849
Claims priority, application Sweden Mar. 31, 1959
6 Claims. (Cl. 28—1)

The present invention relates to an arrangement for the manufacture of mats of glass fibres or similar fibres. Such mats with glass fibres are used to a great extent as reinforcing material for plastics.

It is known that such mats may be manufactured from glass fibre threads of great length in such a way that glass fibre threads are carried forward by a mechanical conveying device to a plurality of ejectors, placed horizontally and in parallel with each other to be thereafter transported by gas flows produced in the ejectors through the ejectors, and further to a horizontal movable surface which picks up the threads while forming a mat. The conveyance of the glass fibre threads has been accomplished in such a way that they have been subjected to a certain twisting and that this twisting has brought about the formation of loops, eyes and the like of the threads, after they have left the ejectors and before they have been picked up by the movable surface. In order to increase the adherence between the threads in the mat, it is known to apply a binder and, under certain circumstances, subject the binder to a heat treatment while the mat is on the movable surface.

It has, however, been proved that mats produced by using the described process, have the very serious disadvantage that they show great irregularity in thickness and in weight per unit of area. During the manufacture of mats, longitudinal accumulations or rolls are formed with a larger amount of material than adjacent parts. The reason for this behaviour is seen to be disturbances and irregularities in the gas flows which occur in the region outside the outlet orifices of the ejectors, and which promote the conveyance of the glass fibre threads from the ejectors to the movable surface. The disturbances in the progress of the flow in or outside the outlet nozzle of one ejector is seen to influence the progress of the flows outside the outlet nozzles of the other ejectors with the result that an irregular distribution of the glass fibre threads is obtained on the movable surface.

The present invention relates to an improvement of the arrangement previously used with the described method. By using the new arrangement, the disadvantage that the distribution of the fibre material on the movable surface becomes irregular, obtained with the previously known arrangement, is eliminated. The invention is related to an arrangement for the production of mats of yarns or threads with great length, consisting of glass fibres or similar fibres, which comprises a substantially horizontal movable surface and a plurality of ejectors arranged across the movable surface in substantially parallel planes, in which ejectors gas flows are simultaneously produced which convey yarns with great length through the ejectors and then to the movable surface which picks up the yarns while forming a mat. The arrangement according to the invention is characterised in that it is provided with screens substantially parallel to the longitudinal directions of the ejectors and extending outside the outlets of the ejectors and between the ejectors in such a direction that the region outside each ejector's outlet orifice is separated from the corresponding region outside adjacent ejectors' outlet orifices.

According to a particularly advantageous embodiment of the invention, the longitudinal direction of each ejector is horizontal, or forms an acute angle with the horizontal plane. Advantageously, the screens may be arranged in substantially vertical planes. They could be arranged to that they are detached from the ejectors, but could also be fixed to the ejectors or to extensions of the ejectors. The screens may suitably be arranged changeable in their positions so that the gas flows outside the outlet orifices of the ejectors can be regulated by displacing or turning the screens.

The invention is described more closely with reference to the figures in the accompanying drawing. The following detailed description of suitable embodiments is given only by way of example and is not intended to be limiting.

FIGURE 1 illustrates schematically an arrangement according to the invention for the manufacture of glass fibre mats in which the shown ejector and the shown screen are considerably enlarged.

FIGURE 2 shows a mat manufactured in an arrangement according to the invention, seen from above.

FIGURE 3 shows an example of an arrangement of ejectors with intervening screens.

FIGURE 4 shows an example of a usable ejector.

FIGURE 5 is an enlargement of the encircled portion of the ejector in FIGURE 4.

Fibre threads 1 are carried via a guide roller 2 by a mechanical conveying device 3 comprising two opposite rollers working against each other, to a plurality of horizontal ejectors placed in parallel beside each other, of which one, 4, is visible in FIGURE 1. The fibre threads are carried through the ejectors by gas flows which are produced by a supply of compressed air through a feeding pipe 5, and so onto an endless gauze wire 6. In the region outside the outlet orifices of the ejectors 7, the threads form loops, eyes and the like before they are picked up by the endless wire. This formation of loops and the like is connected at least partly with the threads undergoing a certain twisting in conjunction with the threads being unwound, in this case the stationary bobbins 8, a twisting which can then be increased at the passage of the ejector. The gas flows which exist outside the outlet orifices 7 of the ejectors are guided by screens 9 placed between the ejectors. The screens are hung on pins 10 so that they are movable in the ejectors' longitudinal direction. The pins are fixed to a beam 11 by means of bolts 12. By providing the beam with slots for the bolts the screens can be removed sideways. Since each screen is fixed to the beam at only one point, the screen is turnable. By making the position of the screens changeable, their guiding influence on the gas flows can be regulated.

When the threads are picked up by the wire 6, continuous mat 13 is formed which is shown seen from above in FIGURE 2. The thickness of the mat can be varied, among other ways, by varying the number of threads which are collected from the bobbins 8 and introduced into each ejector. In certain circumstances a binder can be supplied to the mat via a spreading arrangement 14 in order to increase the adherence between the threads. The device 15 constitutes a suction box which draws the fibres against the wire and which, if binder is supplied, absorbs any excess of this. If binder is used, the mat can be lifted over onto a second wire 16 which carries the mat through a drying oven 17, before the mat is wound onto a winding device 18. By allowing the longitudinal direction of the ejectors to form different angles with the horizontal plane, the shapes of the loops and eyes formed can be altered, which in turn means that the strength of the mat in the longitudinal and cross directions can be varied. The devices 3 and 18 and the endless wires may be driven by conventional motors, not shown in the figures.

FIGURE 3 shows three of several ejectors 4, lying beside each other with screens 9 placed between them, seen from above. The screens are attached in the manner previously described, to the beam 11 and movable with respect to their positions. In accordance with FIGURE 3, two screens are placed between adjacent ejectors. However, it is possible to use one screen.

FIGURE 4 shows an example of an ejector. It has an axially-running through-hole limited by an inlet orifice 23, by a cylindrical part 24 with externally conical part 25, by a cylindrical pipe 26 with internally conical part 27, and by the outlet orifice 28. The conical part 25 is provided with four symmetrically positioned longitudinal grooves 29, through which the compressed air from the room 30 and the compressed air inlet 31 flows out through the hole 32.

When comparing experiments which were carried out with and without using screens placed between the ejectors according to FIGURE 4, but with other conditions the same, an appreciably more even distribution of the fibres in the mat was obtained by using the screens. In the mentioned experiments an air pressure of 1.5 atmosphere guage was used for the air supplied to the ejector. Each groove 29 in the ejector had a cut area of 1 mm.$^2$, and the hole 32, a 6 mm. diameter. The orifices 7 of the ejectors were situated 95 mm. from the nearest side of the beam 11, and the screens 9 were placed between the ejectors with the outer edges projecting 60 mm. outside the orifices 7. The distance between the centre line of adjacent ejectors was 60 mm. The conveying device 3 gave the threads a speed of 170 m./min. and the speed of the wire was 2.6 m./min. The width of the mat was 1 m. and the number of threads brought to each ejector twelve. By cutting out pieces of the mat 1 dm.$^2$ large, straight across, and weighing the pieces, when using the screens a divergence of 5% from the average weight of the pieces was obtained for the piece which showed the greatest divergence from the average. The corresponding result with the manufacture of mat without using screens was 45%.

We claim:

1. Arrangement for manufacturing mats of fibre yarns and threads with great length, comprising a substantially horizontal surface capable of motion; a plurality of ejectors arranged straight across the surface capable of motion, and with their longitudinal directions in substantially parallel planes, in which ejectors gas flows are produced, which simultaneously transport fibre yarns with great length through the ejectors and further to the surface capable of motion, which picks up the yarns while forming a mat; stationary screens substantially parallel to the longitudinal directions of the ejectors and extending outside the outlet orifices of the ejectors and in a direction between the ejectors, whereby the region outside the outlet orifice of each ejector is separated from the corresponding region outside the outlet orifices of the adjacent ejectors.

2. Arrangement for manufacturing mats of fibre yarns and threads with great length, comprising a substantially horizontal surface capable of motion; a plurality of ejectors arranged straight across the surface capable of motion, the longitudinal directions of the ejectors being substantially horizontal and arranged in substantially parallel planes, in which ejectors gas flows are produced which transport fibre yarns with great length simultaneously through the ejectors and further to the surface capable of motion, which picks up the yarns while forming a mat; stationary screens substantially parallel to the longitudinal directions of the ejectors and extending outside the outlet orifices of the ejectors and in a direction between the ejectors, whereby the region outside the outlet orifice of each ejector is separated from the corresponding region outside the outlet orifices of the adjacent ejectors.

3. Arrangement for manufacturing mats of fibre yarns and threads with great length, comprising a substantially horizontal surface capable of motion, a plurality of ejectors arranged straight across the surface capable of motion, the longitudinal directions of the ejectors forming an acute angle with the horizontal plane and being arranged in substantially parallel planes, in which ejectors gas flows are produced which transport fibre yarns with great length simultaneously through the ejectors and further to the surface capable of motion, which picks up the yarns while forming a mat, stationary screens substantially parallel to the longitudinal directions of the ejectors and extending outside the outlet orifices of the ejectors and in a direction between the ejectors, whereby the region outside the outlet orifice of each ejector is separated from the corresponding region outside the outlet orifices of the adjacent ejectors.

4. Arrangement for manufactuing mats of fibre yarns and threads with great length, comprising a substantially horizontal surface capable of motion, a plurality of ejectors arranged straight across the surface capable of motion, and with their longitudinal directions in substantially parallel planes, in which ejectors gas flows are produced which transport fibre yarns with great length simultaneously through the ejectors and further to the surface capable of motion which picks up the yarns while forming a mat, stationary screens arranged in substantially vertical planes and substantially parallel to the longitudinal directions of the ejectors and extending outside the outlet orifices of the ejectors and in a direction between the ejectors, whereby the region outside the outlet orifice of each ejector is separated from the corresponding region outside the outlet orifices of the adjacent ejectors.

5. Arrangement for manufacturing mats of fibre yarns and threads with great length, comprising a substantially horizontal surface capable of motion, a plurality of ejectors arranged straight across the surface capable of motion, the longitudinal directions of the ejectors being substantially horizontal and arranged in substantially parallel planes, in which ejectors gas flows are produced which transport fibre yarns with great length simultaneously through the ejectors and further to the surface capable of motion, which picks up the yarns while forming a mat, stationary screens arranged in substantially vertical planes and substantially parallel to the longitudinal directions of the ejectors and extending outside the outlet orifices of the ejectors and in a direction between the ejectors, whereby the region outside the outlet orifice of each ejector is separated from the corresponding region outside the outlet orifices of the adjacent ejectors.

6. Arrangement for manufacturing mats of fibre yarns and threads with great length, comprising a substantially horizontal surface capable of motion, a plurality of ejectors arranged straight across the surface capable of motion, the longitudinal directions of the ejectors forming an acute angle with the horizontal plane and being arranged in substantially parallel planes, in which ejectors gas flows are produced which transport fibre yarns with great length simultaneously through the ejectors and further to the surface capable of motion, which picks up the yarns while forming a mat, stationary screens arranged in substantially vertical planes and substantially parallel to the longitudinal directions of the ejectors and extending outside the outlet orifices of the ejectors and in a direction between the ejectors, whereby the region outside the outlet orifice of each ejector is separated from the corresponding region outside the outlet orifices of the adjacent ejectors.

References Cited in the file of this patent

UNITED STATES PATENTS

| | | |
|---|---|---|
| 2,577,214 | Slayter | Dec. 4, 1951 |
| 2,653,416 | Slayter | Sept. 29, 1953 |
| 2,693,844 | Bay | Nov. 9, 1954 |
| 2,694,896 | Winslow et al. | Nov. 23, 1954 |
| 2,811,825 | Cumberworth | Nov. 5, 1957 |

FOREIGN PATENTS

| | | |
|---|---|---|
| 666,591 | Great Britain | Feb. 13, 1952 |